(12) United States Patent
Koizumi

(10) Patent No.: US 11,817,135 B2
(45) Date of Patent: Nov. 14, 2023

(54) MAGNETIC HEAD AND MAGNETIC RECORDING/REPRODUCING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Gaku Koizumi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/860,430

(22) Filed: Jul. 8, 2022

(65) Prior Publication Data

US 2023/0245678 A1    Aug. 3, 2023

(30) Foreign Application Priority Data

Feb. 1, 2022 (JP) ................................. 2022-014220

(51) Int. Cl.
  *G11B 5/23*    (2006.01)
  *G11B 5/187*   (2006.01)
(52) U.S. Cl.
  CPC .............. *G11B 5/23* (2013.01); *G11B 5/1877* (2013.01)
(58) Field of Classification Search
  None
  See application file for complete search history.

(56) References Cited

U.S. PATENT DOCUMENTS

| 8,896,947 | B2 | 11/2014 | Koizumi et al. |
| 9,218,828 | B1* | 12/2015 | Koui ..................... G11B 5/3146 |
| 9,305,584 | B2* | 4/2016 | Koizumi ................ G11B 5/607 |
| 10,014,009 | B1* | 7/2018 | Koizumi .............. G11B 5/3906 |
| 10,734,017 | B2 | 8/2020 | Narita et al. |
| 2007/0171694 | A1* | 7/2007 | Huai .................... G11C 11/1693 |
| | | | 257/E43.004 |
| 2013/0050865 | A1* | 2/2013 | Katada ................. G11B 5/1278 |
| | | | 360/75 |
| 2013/0314820 | A1* | 11/2013 | Shimizu ............... G11B 5/3133 |
| | | | 360/244.5 |

(Continued)

FOREIGN PATENT DOCUMENTS

JP         2001250206 A   *  9/2001  ............. B82Y 10/00
JP         2012-014792 A     1/2012

(Continued)

*Primary Examiner* — William J Klimowicz
(74) *Attorney, Agent, or Firm* — Kim & Stewart LLP

(57) ABSTRACT

According to one embodiment, a magnetic head includes a main pole, an auxiliary magnetic pole provided with a write gap in the main pole, a spin torque control element provided in the write gap, a bias current control portion which supplies a bias current to the spin torque control element, and a resistance measuring portion which measures a resistance value of the spin torque control element. The absolute value of a difference between a first resistance value when a bias current is applied with a polarity that magnetization of the spin torque control element is reversed and a second resistance value when the bias current is applied to a reversed polarity of the polarity is less than or equal to 4%.

10 Claims, 13 Drawing Sheets

(56) References Cited

U.S. PATENT DOCUMENTS

| | | | |
|---|---|---|---|
| 2014/0085753 A1* | 3/2014 | Nagasaka | G11B 5/314 360/110 |
| 2014/0118861 A1* | 5/2014 | Funayama | G11B 5/1278 360/123.02 |
| 2014/0168808 A1* | 6/2014 | Koizumi | G11B 5/40 360/31 |
| 2016/0225392 A1* | 8/2016 | Takeo | G11B 5/3166 |
| 2019/0244635 A1* | 8/2019 | Goncharov | G11B 5/6082 |
| 2021/0272597 A1* | 9/2021 | Okada | G11B 5/314 360/110 |

FOREIGN PATENT DOCUMENTS

| | | | | |
|---|---|---|---|---|
| JP | 5106667 B1 * | 12/2012 | | G11B 5/1278 |
| JP | 2014-086122 A | 5/2014 | | |
| JP | 2014-120190 A | 6/2014 | | |
| JP | 2016143431 A * | 8/2016 | | B82Y 10/00 |
| JP | 2018-133119 A | 8/2018 | | |
| JP | 6867982 B2 | 5/2021 | | |

* cited by examiner

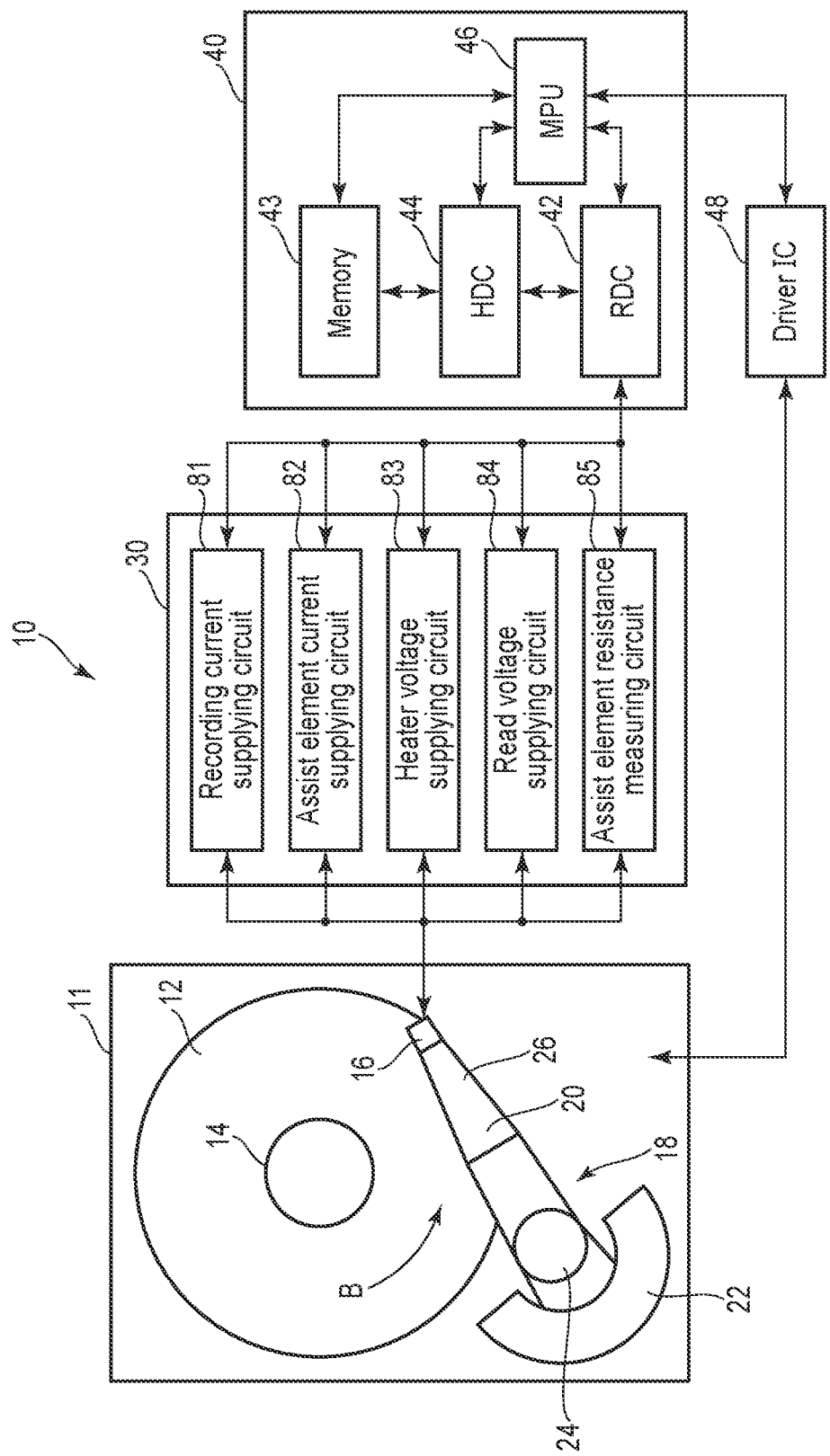
F I G. 1

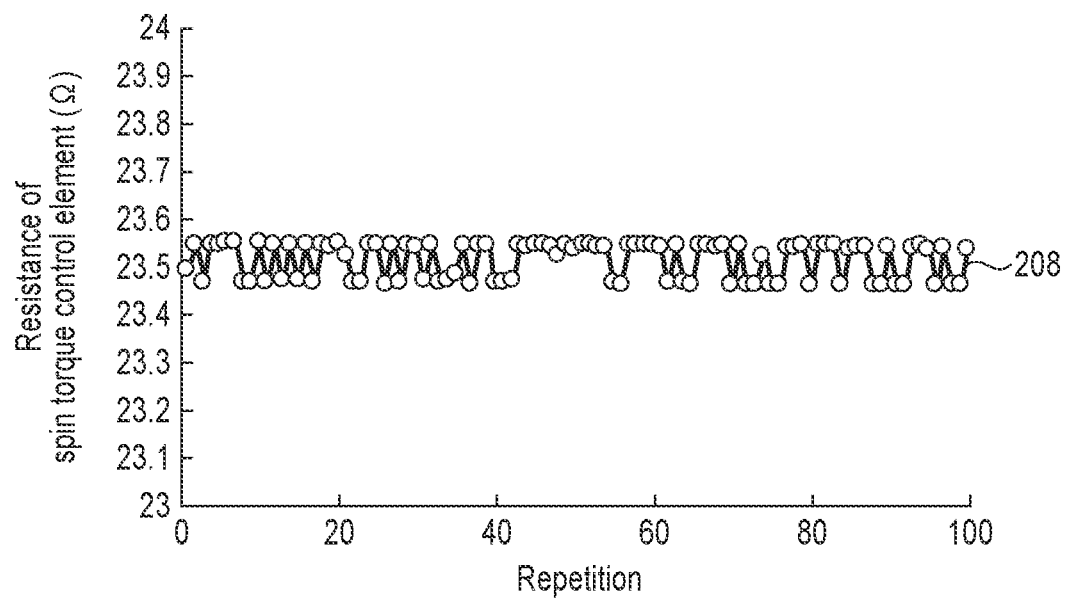
F I G. 11
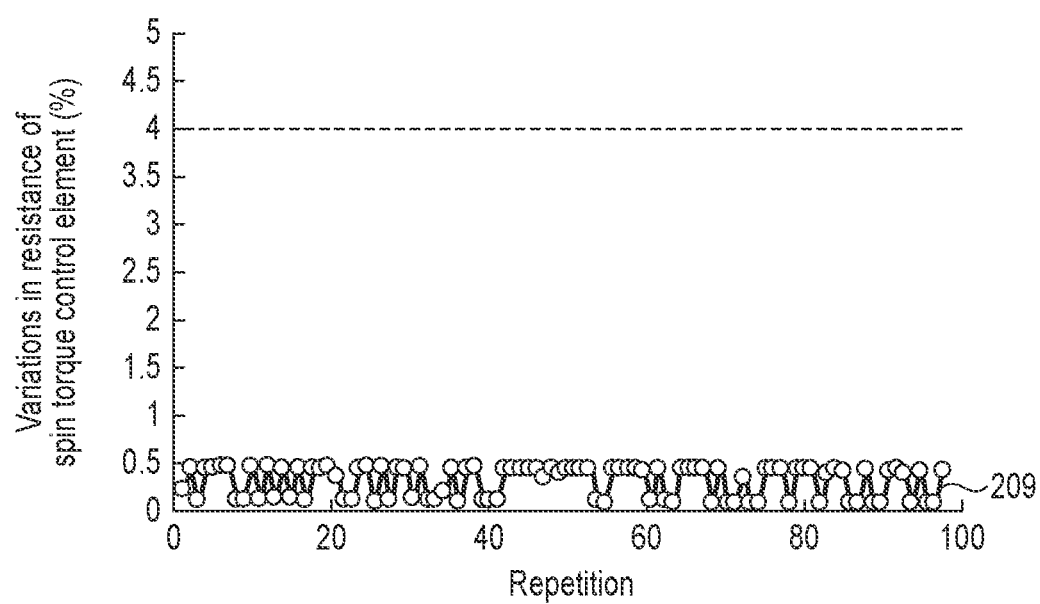
F I G. 12

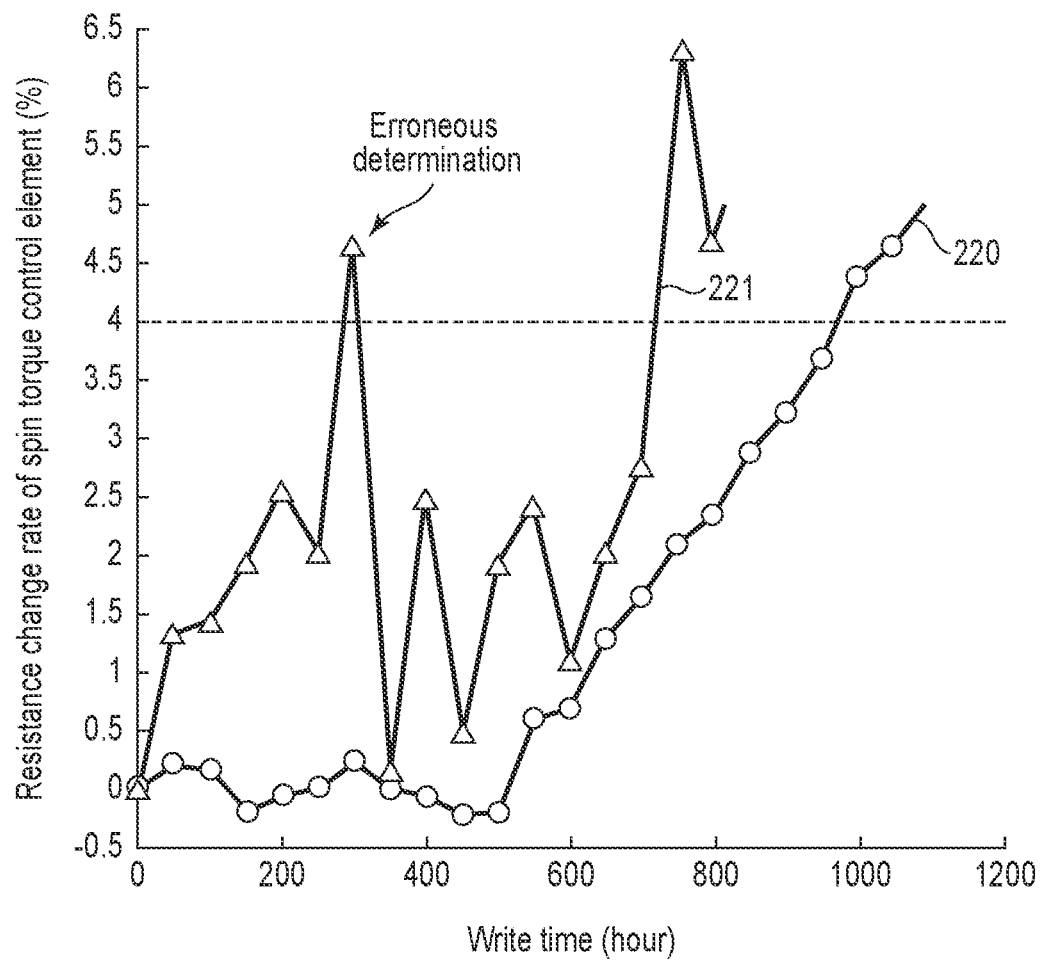
F I G. 15

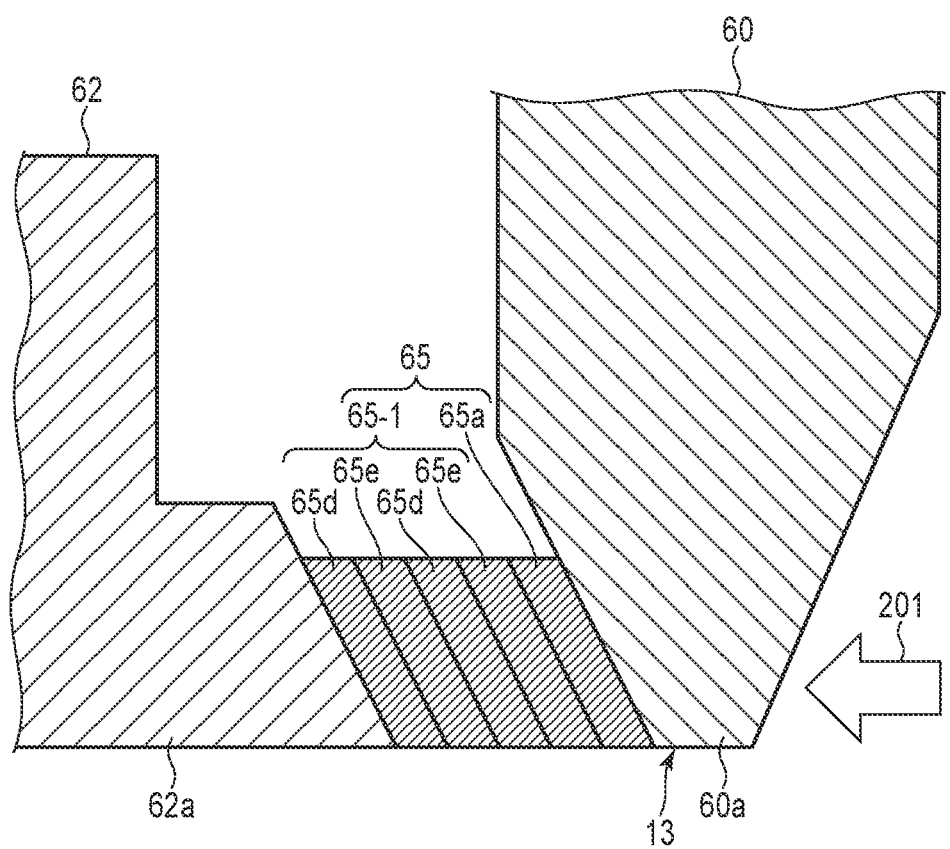
F I G. 16

MAGNETIC HEAD AND MAGNETIC RECORDING/REPRODUCING DEVICE

CROSS-REFERENCE TO RELATED APPLICATIONS

This application is based upon and claims the benefit of priority from Japanese Patent Application No. 2022-014220, filed Feb. 1, 2022, the entire contents of which are incorporated herein by reference.

FIELD

Embodiments described herein relate generally to a magnetic head and magnetic recording/reproducing device.

BACKGROUND

In a magnetic recording/reproducing device including an assist element such as a spin torque control element, a sign that the spin torque control element undergoes oxidation degradation due to long-time dive or the like under high temperature conditions can be detected on the basis of an increase in the resistance of the spin torque control element. However, the spin torque control element is liable to enter a disorderly residual magnetization state after a write operation and, concomitantly with this, the resistance value varies due to the magnetoresistance effect, and hence there has been a problem that it is difficult to detect presence/absence of oxidation degradation with a high degree of accuracy.

BRIEF DESCRIPTION OF THE DRAWINGS

FIG. 1 is a block diagram schematically showing a magnetic disk device (HDD) according to an embodiment.

FIG. 11 is a graph showing a result of a resistance value measurement test of a sample according to the embodiment.

FIG. 12 is a view showing percentages of variations in the resistance value of FIG. 11.

FIG. 15 is a graph showing a relationship between the write time and resistance value of the spin torque control element as an example of detecting oxidation degradation of the spin torque control element by monitoring the resistance value of the spin torque control element at regular time intervals during a drive operation.

FIG. 16 is a cross-sectional view schematically showing another example of a magnetic head used in the embodiment.

DETAILED DESCRIPTION

Figure 2:
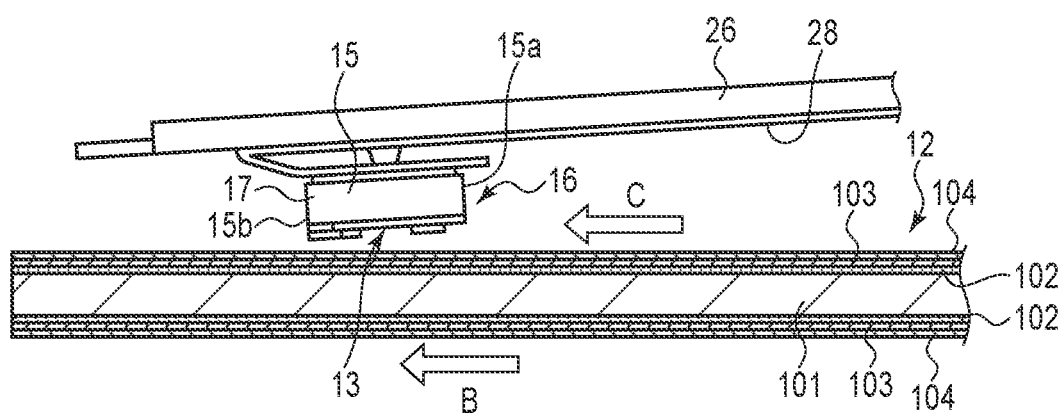
FIG. 2 is a side view showing a magnetic head, suspension, and recording medium in the HDD according to the embodiment.

In general, according to one embodiment, a magnetic head comprises a main pole, an auxiliary magnetic pole provided with a write gap in the main pole, a spin torque control element provided in the write gap, a bias current control portion which supplies a bias current to the spin torque control element, and a resistance measuring portion which measures a resistance value of the spin torque control element. In the magnetic head according to the embodiment, an absolute value of a difference between a first resistance value when a bias current is applied with a polarity that magnetization of the spin torque control element is reversed and a second resistance value when the bias current is applied with a reversed polarity of the polarity is less than or equal to 4%.

According to another embodiment, a magnetic head comprises a main pole, an auxiliary magnetic pole provided with a write gap in the main pole, and a spin torque control element provided in the write gap. In the magnetic head according to the second embodiment, an absolute value of a magnetoresistance effect between the spin torque control element and the auxiliary magnetic pole or between the spin torque control element and the main pole is less than or equal to 4%.

According to sill another embodiment, a magnetic recording/reproducing device comprises the magnetic head according the one or the other embodiment.

According to the magnetic head of the embodiment, the absolute value of a difference between a first resistance value and second resistance value is less than or equal to 4% or the absolute value of a magnetoresistance effect between the spin torque control element and auxiliary magnetic pole or between the spin torque control element and main pole is less than or equal to 4%, and therefore it possible to suppress the variations in the resistance value of the spin torque control element after the write operation and detect the sign of oxidation degradation of the spin torque control element from the resistance change with a high degree of accuracy.

The spin torque control element can contain a magnetization control layer and a nonmagnetic conducting layer.

The spin torque control element can use a plurality of magnetization control layers and a plurality of nonmagnetic conducting layers, the magnetization control layers and nonmagnetic conducting layer can be stacked alternately on top of each other in layers.

In order to make the absolute value of the difference between the first resistance value and second resistance value less than or equal to 4% or make the absolute value of the magnetoresistance effect between the spin torque control element and auxiliary magnetic pole or between the spin torque control element and main pole less than or equal to 4%, the material, thickness or the like of the magnetization control layer or nonmagnetic conducting layer can be adjusted.

The magnetization control layer can use an alloy containing at least one first element selected from iron (Fe), cobalt (Co), and nickel (Ni). Furthermore, the magnetization control layer can be constituted of an alloy material containing the first element and at least one second element selected from chromium (Cr), vanadium (V), manganese (Mn), titanium (Ti), scandium (Sc), molybdenum (Mo), palladium (Pd), and iridium (Ir).

Alternatively, the magnetization control layer can be constituted of multilayers of a first layer of at least one first element selected from Fe, Co, and Ni and a second layer of at least one second element other than the first element. Furthermore, the second element can be selected from Cr, V, Mn, Ti, Sc, Mo, Pd, and Ir.

It is possible to make, for example, the spin polarizability absolute value of the magnetization control layer 0 to 0.2. Examples of the material having such a characteristic are FeCr and FeV.

When the film thickness of the magnetization control layer is set as tF and spin diffusion length is set as $\lambda F$, it is possible to set the condition $tF \leq \lambda F$. Assuming a case where the spin torque control element is operated by the spin torque between itself and the auxiliary magnetic pole, the spin diffusion length $\lambda F$ is such a distance that the spin of conducting electrons having no bias in the direction of injection (implantation) from the nonmagnetic conducting layer on the main pole side to the magnetization control layer is alleviated and is changed in the direction thereof concomitantly with the conduction from the magnetization control layer to the nonmagnetic conducting layer on the auxiliary magnetic pole side. For this reason, the condition $tF \leq \lambda F$ is obtained and, when the spin diffusion length $\lambda F$ of the magnetization control layer is long, even if the spin polarizability of the magnetization control layer is large, spin information from the injected (implanted) nonmagnetic conducting layer is not lost, no bias occurs in the in the direction of the spin flowing from the magnetization control layer to the auxiliary magnetic pole side, and hence the resistance change when the direction of magnetization of the magnetization control layer and auxiliary magnetic pole is changed tends not to occur.

Further, when the film thickness of the nonmagnetic conducting layer on the interface side in which the spin torque occurs is set as is and spin diffusion length is set as $\lambda s$, it is possible to set the condition $ts \geq \lambda s$. Assuming that the spin torque control element is operated by the spin torque between itself and the auxiliary magnetic pole, the spin diffusion length $\lambda s$ is such a distance that the spin of the conducting electrons having a bias in the direction of flow from the magnetization control layer to the auxiliary magnetic pole side is alleviated and is changed in the direction thereof so as to become non-biased in the direction. Accordingly, when the condition $ts \geq \lambda s$ is set, even if the spin polarizability of the magnetization control layer is large, no bias comes to occur in the direction of the spin flowing from the magnetization control layer to the auxiliary magnetic pole side, and hence the resistance change when the direction of magnetization of the magnetization control layer and auxiliary magnetic pole is changed tends not to occur.

Further, it is possible to make the film thickness of the magnetization control layer greater than or equal to 0.5 nm and less than or equal to 20 nm. With a small thickness such as less than 0.5 nm, there is a tendency for crystal growth not to sufficiently advance, thereby causing disappearance of magnetization. On the other hand, in order to secure the record line recording performance, it is desirable in general that the write gap length be less than or equal to 20 nm, and hence it is possible to make the film thickness of the magnetization control layer less than or equal to 20 nm even at the maximum.

When the nonmagnetic conducting layer on the main pole side is made the first nonmagnetic conducting layer, and nonmagnetic conducting layer on the auxiliary magnetic pole side is made the second nonmagnetic conducting layer, as the material for the first nonmagnetic conducting layer, a material having a short spin diffusion length such as Ta, Ru, Ir or the like can be named and, as the material for the second nonmagnetic conducting layer, a material having a long spin diffusion length such as Cu, Ag, Cr, NiCr or the like can be named. It should be noted that it is possible to interchange the first nonmagnetic conducting layer and second nonmagnetic conducting layer with each other.

Hereinafter, an embodiment will be described with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

Example 1

Figure 3:
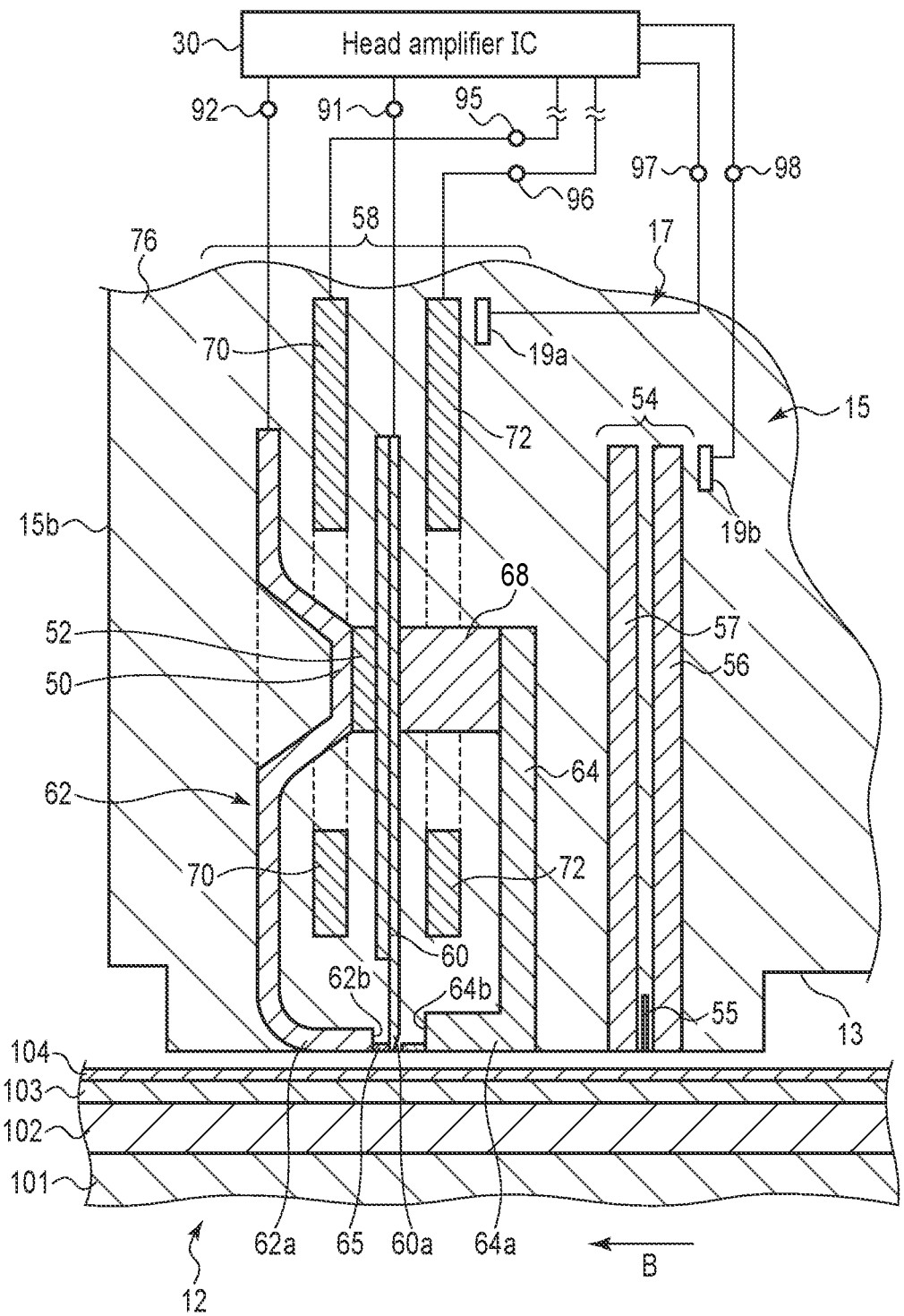
FIG. 3 is a cross-sectional view schematically showing part of a head portion of the magnetic head used in the embodiment and magnetic disk in an enlarged form.

FIG. 1 is a block diagram schematically showing a hard disk drive (HDD) which is a magnetic disk device according to an embodiment, FIG. 2 is a side view showing a magnetic head in the levitated state and magnetic disk, and FIG. 3 is a cross-sectional view schematically showing part of a head portion of the magnetic head and magnetic disk in an enlarged form.

As shown in FIG. 1, the HDD 10 includes a housing 11 having a rectangular shape, magnetic disk 12 functioning as a recording medium arranged inside the housing 11, spindle motor 14 configured to support thereon and rotate the magnetic disk 12, and a plurality of magnetic heads 16 configured to carry out write/read of data to/from the magnetic disk 12. Further, the HDD 10 includes a head actuator 18 configured to move the magnetic head 16 to a position on an arbitrary track on the magnetic disk 12 and carry out positioning of the magnetic head 16. The head actuator 18 includes a suspension assembly 20 movably supporting thereon the magnetic heads 16, and voice coil motor (VCM) 22 configured to swing (turn) the suspension assembly 20.

The HDD 10 includes a head amplifier IC 30, main controller 40, and driver IC 48. The head amplifier IC 30 is provided on, for example, the suspension assembly 20 and is electrically connected to the magnetic heads 16. The main controller 40 and driver IC 48 are configured, for example, on a control circuit board (not shown) provided on the back surface side of the housing 11. The main controller 40 includes an R/W channel (RDC) 42, hard disk controller (HDC) 44, and microprocessor (MPU) 46. The main controller 40 is electrically connected to the head amplifier IC 30 and is electrically connected to the VCM 22 and spindle motor 14 through the driver IC 48. The HDD 10 is connectable to a host computer not shown.

As shown in FIG. 1 and FIG. 2, the magnetic disk 12 is a perpendicular magnetic recording medium including a recording layer having anisotropy in the direction perpendicular to the disk surface. More specifically, the magnetic disk 12 includes a substrate 101 formed into a discoid shape having a diameter of, for example, about 2.5 inches (6.35 cm) and constituted of a nonmagnetic material. On each surface of the substrate 101, a soft magnetic layer 102 functioning as a foundation layer, magnetic recording layer 103, and protective film 104 which are in the upper layer part of the layer 102 are stacked on top of each other in sequence in layers. The magnetic disk 12 is coaxially fitted onto a hub of the spindle motor 14. The magnetic disk 12 is rotated by the spindle motor 14 in the direction of the arrow B at a predetermined rotational speed. The suspension assembly 20 includes a bearing portion 24 swingably fixed to the housing 11, and a plurality of suspensions 26 extending from the bearing portion 24. As shown in FIG. 2, the magnetic head 16 is supported on an extension end of each suspension 26. The magnetic head 16 is electrically connected to the head amplifier IC 30 through a wiring member 28 provided on the suspension assembly 20.

Next, the configuration of the magnetic head 16 will be described in detail.

As shown in FIG. 2 and FIG. 3, the magnetic head 16 is configured as a head of the levitation type, and includes a slider 15 formed into a shape of an approximately rectangular parallelepiped, and head portion 17 formed at an end part on the outflow (trailing) side of the slider 15. The slider 15 is formed of, for example, a sintered body (AlTiC) of alumina and titanium carbide, and head portion 17 is constituted of a plurality of thin-film layers.

The slider 15 includes an air bearing surface (ABS) 13 having a rectangular shape and opposed to the surface of the magnetic disk 12. The slider 15 is kept in a state where the slider 15 is levitated from the surface of the magnetic disk 12 by a predetermined height by an airflow C created between the disk surface and ABS 13 by the rotation of the magnetic disk 12. The direction of the airflow C is coincident with the rotational direction B of the magnetic disk 12. The slider 15 includes a leading end 15a positioned on the inflow side of the airflow C and trailing end 15b positioned on the outflow side of the airflow C.

As shown in FIG. 3, the head portion 17 is a magnetic head of the discrete type in which a reproducing head 54 and recording head 58 are formed at the trailing end 15b of the slider 15 by thin-film processing. In order to control the recording/reproducing levitation height of the head portion 17, a recording heater 19a is arranged on the depth side of the recording head 58, and reproducing heater 19b is arranged on the depth side of the reproducing head 54. The reproducing head 54 is constituted of a reproducing element 55 formed of a magnetic film exhibiting the magnetoresistance effect, and upper shield 56 and lower shield 57 formed by arranging shield films on both the trailing side and leading side of the reproducing element 55 so as to interpose the reproducing element 55 formed of the magnetic film between the shields 56 and 57. Lower ends of these reproducing element 55, upper shield 55, and lower shield 57 are exposed at the ABS 13 of the slider 15. The reproducing head 54 is connected to the head amplifier IC 30 through an electrode, and wiring which are not shown, and wiring member 28, and outputs the read data to the head amplifier IC 30.

The recording head 58 is provided on the trailing end 15b side of the slider 15 relatively to the reproducing head 54. The recording head 58 includes a main pole 60 constituted of a high magnetic permeability material generating a recording magnetic field in the direction perpendicular to the surface of the magnetic disk 12, return magnetic pole 62 serving as a trailing shield (write shield, first shield), and leading core 64 serving as a leading shield (second shield). The main pole 60 and return magnetic pole 62 constitute a first magnetic core forming a magnetic path, and main pole 60 and leading core 64 constitute a second magnetic core forming a magnetic path. The recording head 58 includes a first coil (recording coil) 70 wound around the first magnetic core, and second coil (recording coil) 72 wound around the second magnetic core.

As shown in FIG. 3, the main pole 60 extends approximately perpendicular to the surface of the magnetic disk 12. A tip end portion 60a of the main pole 60 on the disk 12 side is narrowed down toward the disk surface in a tapered form, and the tip end portion 60a is formed in such a manner that the cross section thereof has, for example, a trapezoidal shape. A tip end face of the main pole 60 is exposed at the ABS 13 of the slider 15. A width of a trailing side end face 60b is approximately correspondent to a width of a track on the magnetic disk 12.

The return magnetic pole 62 formed of a soft magnetic material is arranged on the trailing side of the main pole 60 and is provided in order to efficiently close the magnetic path through the soft magnetic layer 102 of the magnetic disk 12 immediately under the main pole 60. The return magnetic pole 62 is formed into approximately an L shape and includes a first connection portion 50 connected to the main pole 60. The first connection portion 50 is connected to an upper part of the main pole 60, i.e., a part of the main pole 60 separate from the ABS 13 through a non-conducting body 52.

A tip end portion 62a of the return magnetic pole 62 is formed into a long and thin rectangular shape and a tip end face thereof is exposed at the ABS 13 of the slider 15. A leading side end face 62b of the tip end portion 62a extends in the width direction of the track of the magnetic disk 12 and extends approximately perpendicular to the ABS 13. This leading side end face 62b is opposed to the trailing side end face 60b of the main pole approximately in parallel therewith with a write gap WG held between them.

The first coil 70 is arranged in such a manner as to be wound around the magnetic circuit (first magnetic core) including the main pole 60 and return magnetic pole 62. The first coil 70 is wound around, for example, the first connection portion 50. When a signal is to be written to the magnetic disk 12, by making a recording current flow through the first coil 70, the first coil 70 excites the main pole 60 to thereby make a magnetic flux flow through the main pole 60.

A spin torque control element 65 is provided inside the write gap WG between the tip end portion 60a of the main pole 60 and return magnetic pole 62, and part thereof is exposed at the ABS 13. A lower end face of the spin torque control element 65 is not limited to the case where the lower end face is positioned flush with the ABS 13, and may also be upwardly separate from the ABS 13 in the height direction. It should be noted that the spin torque control element is an example of an assist element, and may be an element intended to obtain an assist effect concomitant with flux control achieved by reversing the magnetization by the spin torque to the direction opposite to the flux direction inside the write gap, thus a configuration (high-frequency assist element) intended to achieve the high-frequency assist effect causing resonance of medium magnetization by making magnetization oscillate at a high frequency by means of the spin torque is conceivable.

As shown in FIG. 3, connection terminals 91 and 92 are respectively connected to the main pole 60 and return magnetic pole 62, and these terminal 91 and 92 are connected to the head amplifier IC 30 through the wiring. Thereby, a current circuit is configured in such a manner as to be able to make a current flow in series from the head amplifier IC 30 through the main pole 60, spin torque control element 65, and return magnetic pole 62. Further, connection terminals 97 and 98 are respectively connected to the recording heater 19a and reproducing heater 19b, and these connection terminals 97 and 98 are connected to the head amplifier IC 30 through the wiring.

As shown in FIG. 3, the leading core 64 formed of a soft magnetic material is provided on the leading side of the main pole 60 in opposition to the main pole 60. The leading core 64 is formed into approximately an L shape and a tip end portion 64a thereof on the magnetic disk 12 side is formed into a long and thin rectangular shape. A tip end face (lower end face) of the tip end portion 64a is exposed at the ABS 13 of the slider 15. A trailing side end face 64b of the tip end portion 64a extends in the width direction of the track of the magnetic disk 12. This trailing side end face 64b is opposed to the leading side end face of the main pole 60 with a gap held between them. This gap is covered with a protective insulating film 76 serving as a nonmagnetic body.

The leading core 64 includes a second connection portion 68 joined to a back gap formed between itself and the main pole 60 at a position separate from the magnetic disk 12. This second connection portion 68 is formed of, for example, a soft magnetic material and constitutes a magnetic circuit together with the main pole 60 and leading core 64. The second coil 72 of the recording head 58 is arranged in such a manner as to be wound around a magnetic circuit (second magnetic core) including the main pole 60 and leading core 64, and applies a magnetic field to this magnetic circuit. The second coil 72 is wound around, for example, the second connection portion 68. It should be noted that a non-conducting body or nonmagnetic body may be inserted into part of the second connection portion 68.

The second coil 72 is wound in a direction opposite to the first coil 70. The first coil 70 and second coil 72 are respectively connected to the terminals 95 and 96, and these terminals 95 and 96 are connected to the head amplifier IC 30 through the wiring. The second coil 72 may also be connected in series to the first coil 70. Further, current supply to the first coil 70 and second coil 72 may be controlled separately from each other. A current to be supplied to each of the first coil 70 and second coil 72 is controlled by the head amplifier IC 30 and main controller 40.

The head amplifier IC 30 configured to drive the magnetic head 16 and recording head 58 includes, as shown in FIG. 1, a recording current supplying circuit 81 configured to supply a recording current to each of the first coil 70 and second coil 72 through the connection terminals 95 and 96, assist element current supplying circuit 82 serving as a bias current control portion configured to supply a bias current to the spin torque control element 65 through the wiring (not shown) and connection terminals 91 and 92, heater voltage supplying circuit 83 configured to supply a heater voltage to each of the recording heater 19a and reproducing heater 19b through the wiring (not shown) and connection terminals 97 and 98, read voltage supplying circuit 84 configured to read a reproduction signal recorded on the magnetic disk 12 after applying a voltage to the reproducing element portion of the magnetic head, and assist element resistance measuring circuit 85 serving as a resistance measuring portion configured to measure the resistance value of the spin torque control element 65. Furthermore, although not shown, the head amplifier IC 30 includes a timing computing portion (not shown) configured to control the time for which a current is applied through the recording current supplying circuit 81 and the timing thereof, and control the time for which a current is applied through the assist element current supplying circuit 82 and the timing thereof, and recording current waveform generator (not shown) configured to generate a recording current waveform according to a recording pattern signal generated by the R/W channel 42. In the assist element resistance measuring circuit 85, the resistance value is periodically measured and is detected, whereby it is possible to monitor the degradation of the spin torque control element 65.

Figure 4:
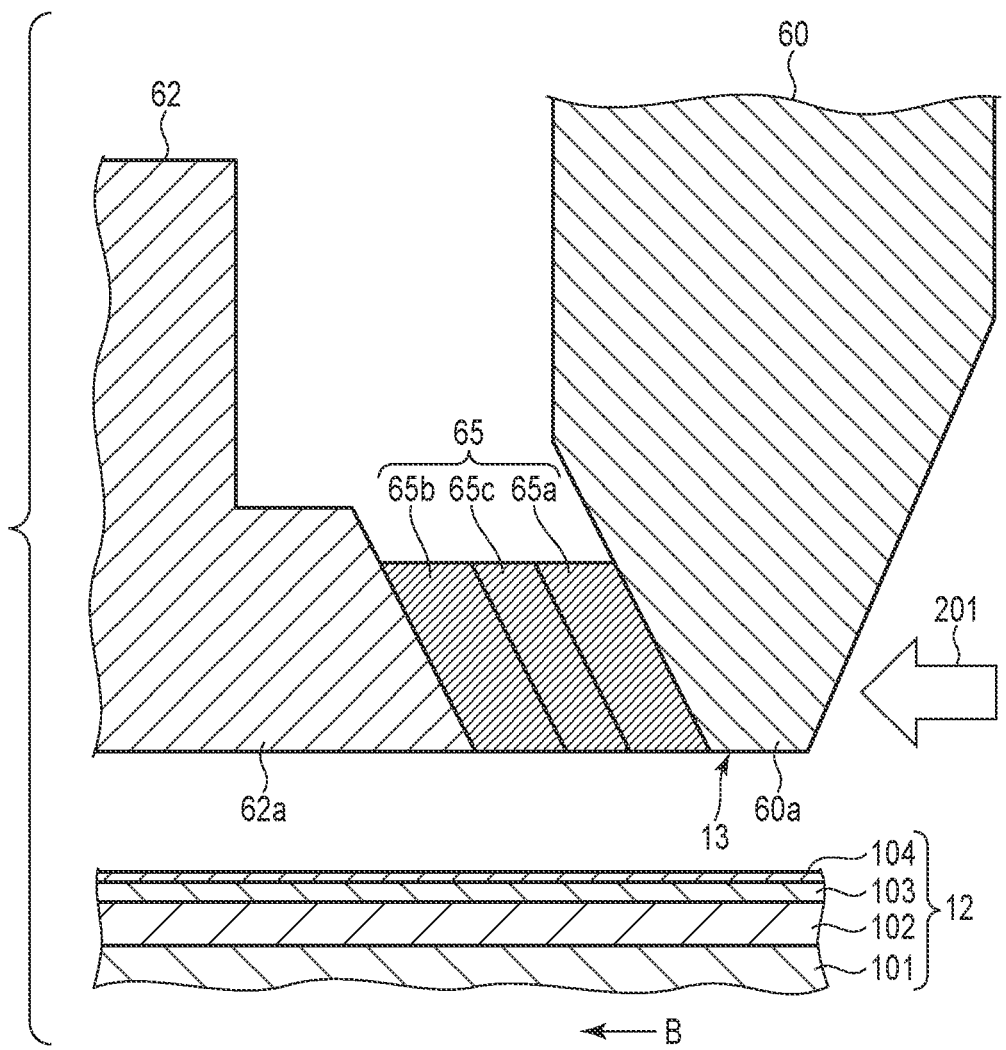
FIG. 4 is a cross-sectional view schematically showing part of a recording head tip end portion of the magnetic head used in the embodiment and magnetic disk in an enlarged form.

FIG. 4 is a cross-sectional view schematically showing a recording head tip end portion of the magnetic head used in the embodiment and part of the magnetic disk in an enlarged form.

Figure 5:
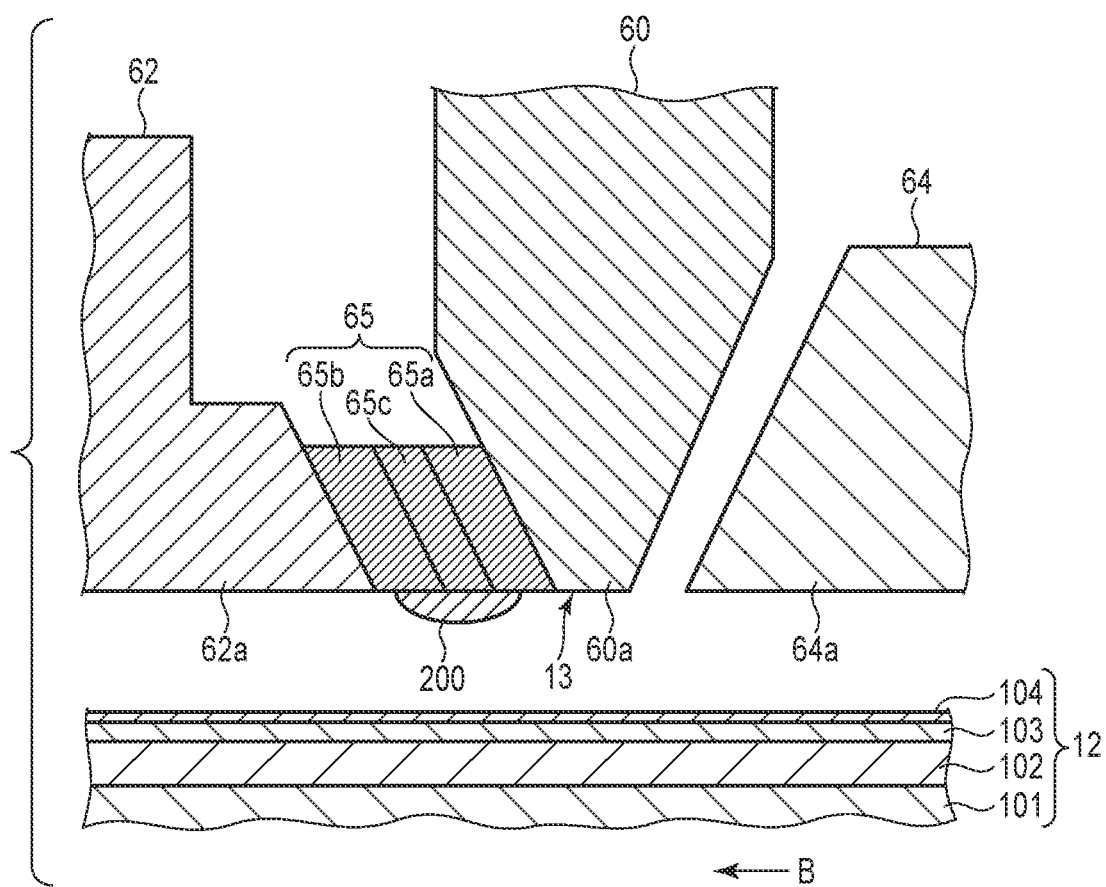
FIG. 5 is a cross-sectional view showing a state where the magnetic head of FIG. 4 has been operated for a long time.

FIG. 5 is a cross-sectional view showing a state where the magnetic head of FIG. 4 has been operated for a long time.

As shown in FIG. 4, the spin torque control element 65 includes a first nonmagnetic conducting layer 65a provided on the tip end portion 60a of the main pole 60 and constituted of a material having a short spin diffusion length, magnetization control layer 65c provided on the first nonmagnetic conducting layer 65a, and second nonmagnetic conducting layer 65b provided on the magnetization control layer 65c and constituted of a material having a long spin diffusion length. As described previously, by making a bias current flow from the head amplifier IC 30 through the main pole 60, spin torque control element 65, and return magnetic pole 62 serially at a current value greater than or equal to a fixed value according to such a polarity that electrons flow from the magnetization control layer 65c to the tip end portion 62a of the return magnetic pole 62, it is possible to make the magnetization control layer 65c oscillate by the spin torque of reflection from the tip end portion 62a of the return magnetic pole 62. Here, the first nonmagnetic conducting layer 65a can be omitted as the need arises. Further, it is also possible to make the bias current flow according to such a polarity that the current flows from the tip end portion 60a of the main pole 60 to the tip end portion 62a of the return magnetic pole 62 through the second nonmagnetic conducting layer 65b, magnetization control layer 65c, and first nonmagnetic conducting layer 65a by reversing the order of film formation of the first nonmagnetic conducting layer 65a, magnetization control layer 65c, and second nonmagnetic conducting layer 65b on the tip end portion 60a of the main pole 60.

In order to drive the spin torque control element 65, it is necessary to make a current flow through the spin torque control element 65. Concomitantly with the flow of the current, the spin torque control element 65 generates heat, and hence, when the spin torque control element 65 is operated for a long time, particularly, in a high-temperature environment, an oxide layer 200 resulting from degradation of the spin torque control element 65 due to oxidation from the ABS side is formed as shown in FIG. 5, thereby causing a problem in the reliability.

Energization Test

For the sake of the energization test, the layers respectively having the following materials and thicknesses were stacked on top of each other in layers in sequence from a main pole 60 between the main pole 60 and return magnetic pole 62 which are constituted of FeCo, whereby film formation of a spin torque control element 65 was carried out and the samples 1 to 10 were manufactured.

Samples 1 to 10
first nonmagnetic conducting layer 65a Ta 10 nm
magnetization control layer 65c NiFe 5 nm
second nonmagnetic conducting layer 65b Cu 2 nm With respect to each of the samples 1 to 10, the spin torque control element was continuously subjected to energization of 7 mA for a long time in a high-temperature environment of 100° C. without carrying out a write operation. An example of the obtained results is shown in Table 1 below.

TABLE 1

| Sample | Initial element resistance value [Ω] | Element resistance value after test [Ω] | Resistance change rate [%] | ABS surface oxidation |
|---|---|---|---|---|
| 1 | 27.9 | 28.3 | 1.3 | Absent |
| 2 | 30.4 | 31.7 | 4.4 | Present |
| 3 | 27.3 | 28.3 | 3.6 | Absent |
| 4 | 27.5 | 28.1 | 1.9 | Absent |
| 5 | 26.9 | 27.7 | 2.9 | Absent |
| 6 | 28.8 | 29.1 | 1.0 | Absent |
| 7 | 26.3 | 26.7 | 1.4 | Absent |
| 8 | 27.9 | 28.6 | 2.4 | Absent |
| 9 | 31.5 | 31.6 | 0.2 | Absent |
| 10 | 29.0 | 30.2 | 4.1 | Present |

As shown in the samples 2 and 10 of Table 1, the sign of oxidation gradation of the spin torque control element 65 has been found from about the time when the resistance change rate of the spin torque control element became about +4% or more, and it is possible to monitor the degradation of the spin torque control element 65 by detecting the resistance value at regular time intervals by the assist element measuring circuit 85 in the head amplifier IC 30 even during a drive operation.

Figure 6:
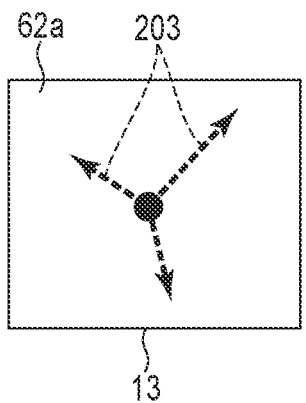
FIG. 6 is a model view showing an example of a direction of magnetization of a return magnetic pole.

FIG. 6 is a model view showing an example of a direction of magnetization of the return magnetic pole viewed from the direction of the arrow 201 of FIG. 4.

Figure 7:
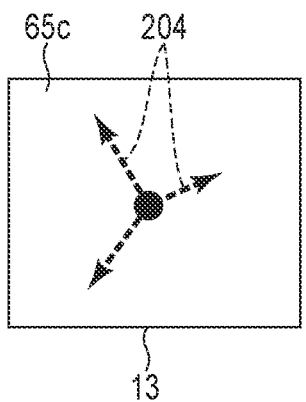
FIG. 7 is a model view showing an example of a direction of magnetization of a magnetization control layer.

FIG. 7 is a model view showing an example of a direction of magnetization of the magnetization control layer viewed from the direction of the arrow 201 of FIG. 4.

Figure 8:
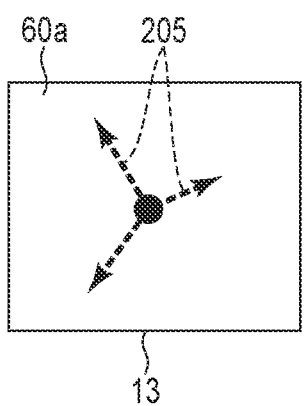
FIG. 8 is a view showing an example of a direction of magnetization of a main pole tip end portion.

FIG. 8 is a view showing an example of a direction of magnetization of the main pole tip end portion viewed from the direction of the arrow 201 of FIG. 4.

In FIGS. 6 to 8, each of numerals 203, 204, and 205 denotes arrows indicating directions of magnetization. A numeral 13 indicates the ABS side.

As shown in FIGS. 6 to 8, regarding the magnetization state after write, magnetization of each of tip end portion 62a of the return magnetic pole 62, magnetization control layer 65c, and tip end portion 60a of the main pole 60 remains in a state where the magnetization is in disorderly directions in the plane of the formed film even when a magnetic erasing operation based on a degaussing operation is carried out, and hence a magnetoresistance effect occurs according to the relative angle between the longitudinal magnetization of the magnetization control layer 65c and longitudinal magnetization of the tip end portion 62a of the return magnetic pole 62, and the resistance value is changed by the magnetization state after the write.

Resistance Value Measurement Test

A sample 11 was manufactured in the same manner as the samples used in the above energization test, the resistance value of the spin torque control element 65 after a write operation was repetitively observed, whereby a resistance value measurement test was carried out.

Figure 9:
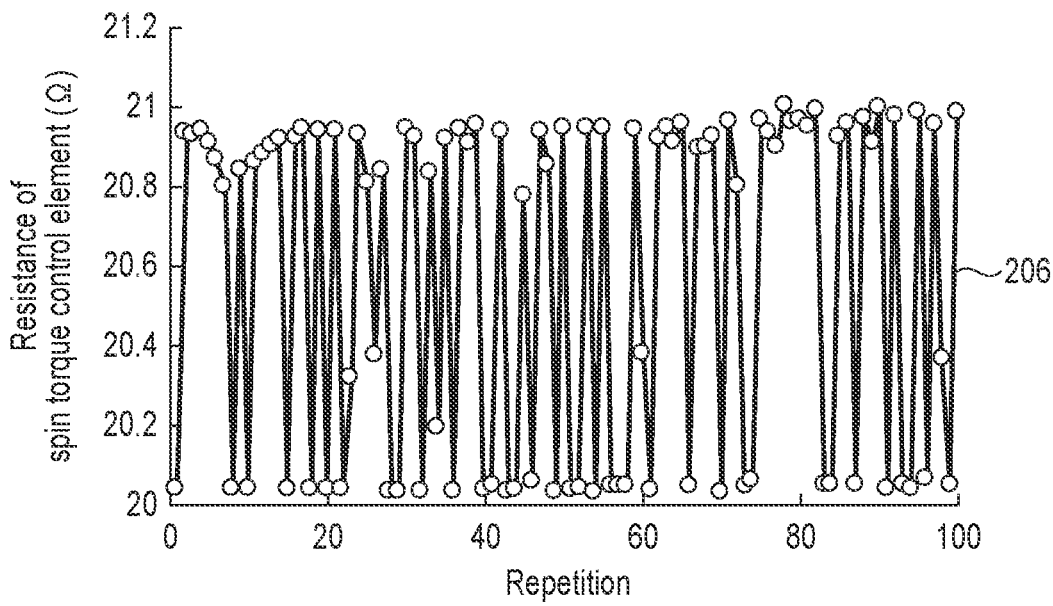
FIG. 9 is a graph showing a result of a resistance value measurement test of a sample.

In FIG. 9, a graph showing a result of the resistance value measurement test of the sample is shown.

Figure 10:
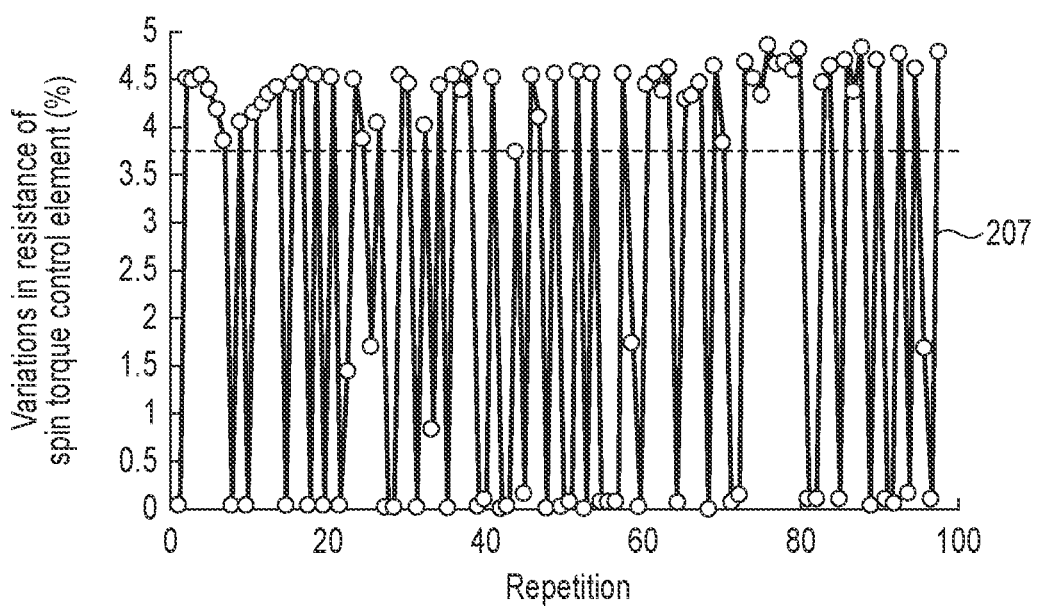
FIG. 10 is a view showing percentages of variations in the resistance value of FIG. 9.

In FIG. 10, a view showing percentages of variations in the resistance value of FIG. 9 is shown.

As shown in FIG. 9, in the sample, variations in the resistance value concomitant with the magnetoresistance effect occur and, as shown in FIG. 10, as to the variability rate from the measured minimum value, a case where the variability rate becomes close to the resistance change rate 4% when the spin torque control element undergoes oxidation degradation arises, and hence it becomes difficult to detect presence/absence of element degradation of the spin torque control element from only the resistance values. Thus, in order to suppress the variations in the resistance value, it is desirable that a configuration in which the magnetoresistance effect is intentionally suppressed be used.

Regarding the magnetoresistance effect in the configuration of a Current-Perpendicular-to-Plane Giant Magnetoresistance element (CPP-GMR element) of the ferromagnetic body/non-magnetic body/ferromagnetic body constituted of the tip end portion 60a of the main pole 60, spin torque control element 65, and tip end portion 62a of return magnetic pole 62 similar to the sample used in the energization test, it is possible to express the magnetoresistance effect by the Valet-Fert model. In the case of a simple symmetric system, the aerial resistance change rate ARA (%) can be expressed by the following formula (1), where spin polarizability of the ferromagnetic body is $\beta$, resistivity (specific resistance) is $\rho F$, film thickness is tF.

$$\Delta RA = \frac{2\beta^2}{1-\beta^2} \rho_F t_F \tag{1}$$

There are no great differences in the conductive properties of ferromagnetic bodies constituted of Fe, Co, Ni or the like commonly used. Further, in the case of the premise of the same film thickness in design, this $\Delta RA$, i.e., the resistance change rate due to the magnetoresistance effect is dependent on the spin polarizability $\beta$ of the ferromagnetic body. As in the case of an example of the sample of the spin torque control element used in the energization test, when a spin torque control element in which commonly used Fe, Co or Ni-based alloy material is used as the magnetization control layer 65c between the tip end portion 60a of the main pole 60 and the tip end portion 62a of the return magnetic pole 62 is used, $\beta$ is a large value of 0.4 to 0.5, and hence a great magnetoresistance effect as shown in FIG. 9 is exhibited. For such a reason, in order to suppress resistance variations, it is desirable that a material having a small absolute value of $\beta$ be used.

As the sample 12 according to the embodiment, between the main pole 60 and return magnetic pole 62 which are each constituted of FeCo, layers having the following materials and thicknesses were stacked in sequence on top of each other in layers from the position on the main pole 60, whereby a spin torque control element 65 was formed.

Sample 12
first nonmagnetic conducting layer 65a Ta 10 nm
magnetization control layer 65c FeCr 5 nm
second nonmagnetic conducting layer 65b Cu 2 nm It should be noted that FeCr is known as a substance having an absolute value of β 0.1 or less.

With respect to the sample 12, the resistance value of the spin torque control element after a write operation was repetitively observed, whereby a resistance value measurement test was carried out as in the case of the aforementioned sample.

In FIG. 11, a graph showing a result of a resistance value measurement test of the sample according to the embodiment is shown.

In FIG. 12, a view showing percentages of variations in the resistance value of FIG. 11 is shown.

As shown in FIG. 11, in the sample 12 according to the embodiment, it was seen that the magnetoresistance effect can be reduced by forming the magnetization control layer by using a material suppressing the spin polarizability absolute value. As a result, as shown in FIG. 12, it is possible to largely reduce the resistance variations.

It should be noted that although here, as the material having an absolute value of β approximately 0.1, FeCr is used for the magnetization control layer 65c, it is possible, as the material for the magnetization control layer, to use an alloy material containing therein at least one first element selected from Fe, Co, and Ni, and at least one second element selected from Cr, V, Mn, Ti, Sc, Mo, Pd, and Ir.

Further, in place of the alloy material of the first element and second element, an artificial lattice of the first element and second element can be used.

As the sample 13 according to the embodiment, between the main pole 60 and return magnetic pole 62 which are each constituted of FeCo, layers having the following materials and thicknesses are stacked in sequence on top of each other in layers from the position on the main pole 60, whereby it is possible to form the film of a spin torque control element 65.

Sample 13
first nonmagnetic conducting layer 65a Ta 10 nm
artificial lattice 5 nm formed by stacking, as the magnetization control layer 65c, the first element Fe, 0.3 nm/second element Cr, 0.2 nm repetitively ten times (ten layers)
second nonmagnetic conducting layer 65b Cu 2 nm Regarding the sample 13 too, by stacking Fe/Cr, it is possible to reduce the variations in the resistance value of the spin torque control element after the write operation as in the case of the sample 12 in which FeCr having a small spin polarizability β is used.

It should be noted that in the spin torque control element according to the embodiment, it is also possible to further provide a foundation layer between the main pole 60 and first nonmagnetic conducting layer 65a. As the foundation layer, for example, Ta, Ru or the like can be named. It is also possible for the main pole 60 and first nonmagnetic conducting layer 65a to be in contact with each other.

It is possible to further provide a gap layer between the second nonmagnetic conducting layer 65b and return magnetic pole 62. As the gap layer, for example, Ta, Ru or the like can be named. It is also possible for the second nonmagnetic conducting layer 65b and return magnetic pole 62 to be in contact with each other.

Regarding the magnetoresistance effect, it is possible to detect the effect in the form different from the resistance value variations of the spin torque control element after write.

Figure 13:
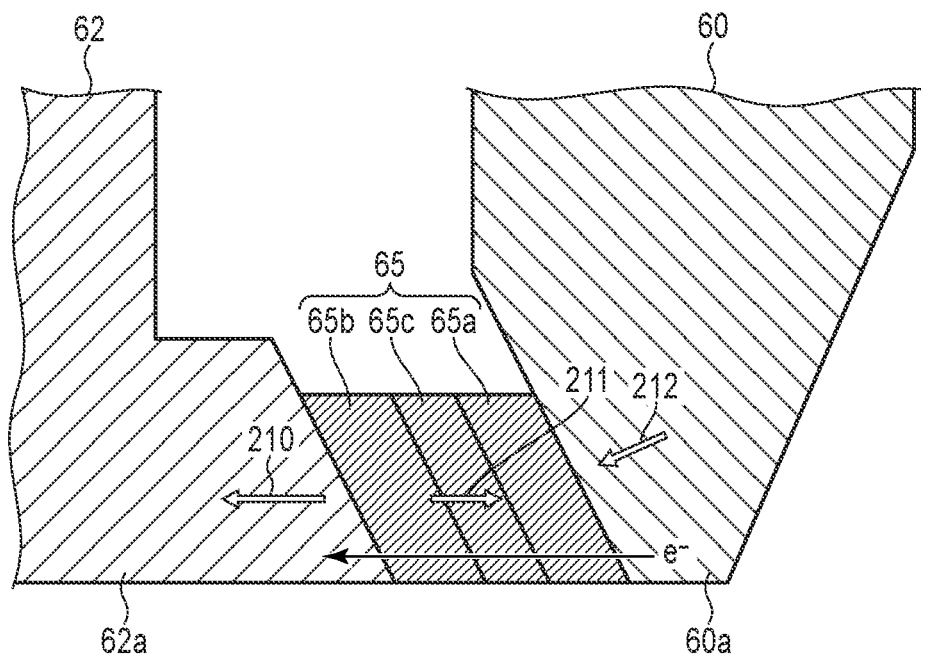
FIG. 13 is a schematic view showing a state where a bias current is applied with a polarity that the magnetization is reversed.

In FIG. 13, a schematic view showing a state where a bias current is applied according to the magnetization reversal polarity is shown.

When a spin torque control element 65 constituted of a first nonmagnetic conducting layer 65a formed of Ta of 10 nm, magnetic control layer 65c formed of NiFe of 5 nm, and second nonmagnetic conducting layer 65b formed of Cu of 2 nm is film-formed between the main pole 60 and return magnetic pole 62 which are each constituted of, for example, FeCo as a spin torque control element having a configuration identical to the samples 1 to 11, and a magnetic disk device is thereby formed, by using the recording current supplying circuit 81 and making a current of about 3 to 5 mA flow through the spin torque control element according to such a polarity that electrons flow from the magnetization control layer 65c to the tip end portion 62a of the return magnetic pole 62, i.e., according to a magnetization reversal polarity as shown in FIG. 13 in a state where a DC current of about 20 to 50 mA is applied through the recording coils, the magnetization of the magnetization control layer 65c is reversed by the spin torque of reflection from the tip end portion 62a of the return magnetic pole 62.

Here, it is acceptable to adjust the amount of the current to be applied through the spin torque control element according to the film thickness and saturation magnetization of the magnetization control layer 65c. At this time, magnetization of the magnetization control layer 65c and magnetization of the tip end portion 62a of the return magnetic pole 62 enter an antiparallel state, and hence the resistance value of the spin torque control element increases by the magnetoresistance effect between the two layers.

Figure 14:
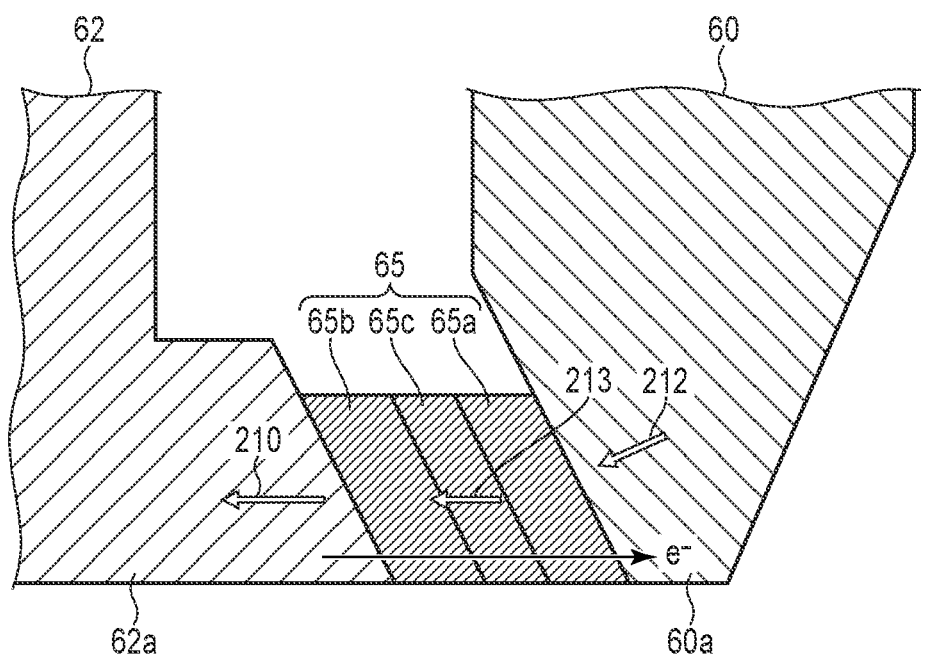
FIG. 14 is a schematic view showing a state where a bias current is applied with a reversed polarity of the polarity that the magnetization is reversed.

In FIG. 14, a schematic view showing a state where a bias current is applied according to the polarity opposite to the magnetization reversal polarity is shown.

On the other hand, as shown in FIG. 14, when the bias energization polarity is reversed at the same recording coil current and bias current, the magnetization of the magnetization control layer 65c is made coincident with the magnetization of the tip end portion 62a of the return magnetic pole 62 by the transmission spin torque from the tip end portion 62a of the return magnetic pole 62 to the magnetization control layer 65c.

In this case, magnetization of the magnetization control layer 65c and magnetization of the tip end portion 62a of the return magnetic pole 62 enter the parallel state, and hence the resistance value of the spin torque control element becomes lower. By obtaining a difference between the spin torque control element resistance values in FIG. 13 and FIG. 14, it is possible to detect the magnetoresistance effect of the spin torque control element.

For example, by monitoring the resistance value of the spin torque control element at regular time intervals during a drive operation, it is possible to detect oxidation degradation of the spin torque control element.

Figure 20:
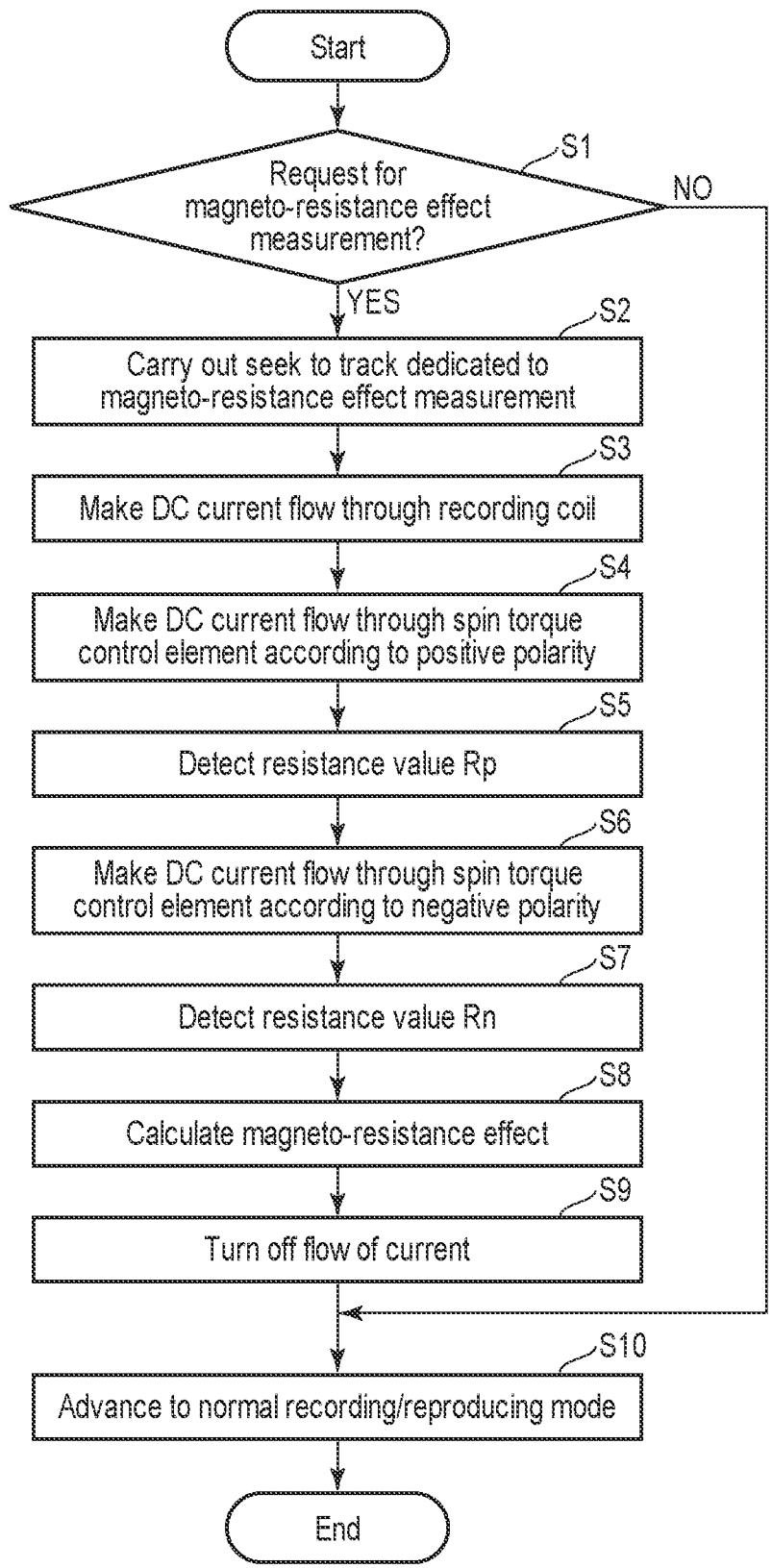
FIG. 20 is a flowchart showing an example of a detection process of a magnetoresistance effect.

A flowchart showing an example of a detection process of a magnetoresistance effect is shown in FIG. 20.

As shown in FIG. 20, first, when a predetermined time has elapsed in the normal recording/reproducing mode, it is determined whether or not a request for magnetoresistance effect measurement is made (S1). When no request is made, the flow proceeds to the normal recording/reproducing mode (S10).

When a request is made, the corresponding magnetic head is subjected to an operation of a seek to a dedicated track (S2) and, thereafter a DC current of 20 to 50 mA is applied through each recording coil (S3).

Next, a desired current is applied from the assist element current supplying circuit 82 to the spin torque control element according to the positive polarity (direction in which electrons flow from the magnetization control layer to the return magnetic pole) (S4). Here, when the magnetization control layer is constituted of NiFe of 5 nm saturation magnetization of which is 1 T (tesla), the amount of the current can be made 3 to 5 mA. This amount of the current can be adjusted according to the film thickness and saturation magnetization. Subsequently, the applied voltage is read back in the assist element resistance measuring circuit 85, whereby the resistance value Rp of the spin torque control element is measured (S5). Likewise, this time, a current of the same amount as step (S4) is applied from the assist element current supplying circuit 82 to the spin torque control element according to the negative polarity (direction in which electrons flow from the return magnetic pole to the magnetization control layer) (S6). The resistance value Rn of the spin torque control element is measured in the assist element resistance measuring circuit 85 (S7). Here, it becomes possible to calculate the magnetoresistance effect occurring when the magnetization control layer magnetization and return magnetic pole magnetization are in the parallel/antiparallel state by using the following formula (2) (S8).

$$|Rp-Rn|/Rn \qquad \ldots (2)$$

After calculating the magnetoresistance effect, the flow of the current from the assist element current supplying circuit 82 to the spin torque control element is turned off (S9), and the flow advances to the normal recording/reproducing mode (S10).

In FIG. 15, a graph showing a relationship between the write time and resistance value of the spin torque control element is shown as an example of detecting oxidation degradation of the spin torque control element by monitoring the resistance value of the spin torque control element at regular time intervals during a drive operation.

In FIG. 15, a numeral 220 indicates a measurement result of the spin torque control element in which the first nonmagnetic conducting layer 65a is constituted of Ta of 10 nm, magnetization control layer 65c is constituted of FeCr of 5 nm, and second nonmagnetic conducting layer 65b is constituted of Cu of 2 nm, and which is used in the embodiment, and numeral 221 indicates a measurement result of a spin torque control element of a comparative example in which the first nonmagnetic conducting layer 65a is constituted of Ta of 10 nm, magnetization control layer 65c is constituted of NiFe of 5 nm, and second nonmagnetic conducting layer 65b is constituted of Cu of 2 nm.

As indicated by the numeral 221, in the measurement result of the spin torque control element of the comparative example, the variations in the resistance value due to the magnetoresistance effect concomitant with the remanent magnetization after the write are significant, and a case of false detection of oxidation degradation occurred and, conversely, as indicated by the numeral 220, it can be seen that when FeCr of 5 nm having a small absolute value 0.1 or less of β is adopted as the magnetization control layer 65c, it becomes possible to suppress the variations in the resistance value and detect degradation of the spin torque control element from the resistance values with a high degree of accuracy.

Example 2

It is possible to reduce the magnetoresistance effect between the magnetization control layer 65c and the tip end portion 62a of the return magnetic pole described in example 1 by also making, when the symmetric system is assumed, the film thickness tF of the ferromagnetic body, i.e., the magnetization control layer 65c small as shown in by the formula (1) and, furthermore, when the spin diffusion length of the magnetization control layer 65c is set as λF, by designing the magnetization control layer 65c in such a manner as to make the magnetization control layer 65c have a film thickness satisfying the condition tF≤λF, it is possible to effectively reduce β without causing spin polarization, and hence it becomes possible to eliminate almost the whole magnetoresistance effect by also designing the film thickness of the magnetization control layer 65c satisfying the condition tF≤λF. For example, although when NiFe having a spin diffusion length λF of about 3 nm is formed into a film having a film thickness tF of 5 nm as the magnetization control layer 65c, spin polarization sufficiently occurs at the second nonmagnetic conducting layer interface due to the condition tF≥λF, and the magnetoresistance effect is caused, it is possible to eliminate almost the whole magnetoresistance effect by forming, as the alternate material, for example, FeCo or FeCr having a spin diffusion length λF of about 10 nm into a film having a film thickness tF of 5 nm.

Example 3

Regarding the magnetoresistance effect between the magnetization control layer 65c and the tip end portion 62a of the return magnetic pole 62 described in example 1, it is possible to reduce the magnetoresistance effect by selecting the material for the second nonmagnetic conducting layer 65b between the two layers.

More specifically, when the film thickness of the second nonmagnetic conducting layer 65b is set as is and spin diffusion length is set as λs, it is possible to eliminate almost the whole magnetoresistance effect by establishing a condition ts≥λs.

For example, in the case of a spin torque control element in which the first nonmagnetic conducting layer 65a is constituted of Ta of 10 nm, magnetization control layer 65c is constituted of NiFe of 5 nm, and second nonmagnetic conducting layer 65b is constituted of Cu of 2 nm having a spin diffusion length λs of 500 nm or less, a condition ts<<λs is given, and hence variations in the resistance value are liable to occur. On the other hand, by forming Ta or Ir having a spin diffusion length λs of 1 to 2 nm, in place of Cu of 2 nm, into a film of 2 nm, it is possible to eliminate almost the whole magnetoresistance effect.

Example 4

An example in which a lamination of a plurality of magnetization control layers and a plurality of nonmagnetic conducting layers is used as the spin torque control element is shown.

In FIG. 16, a cross-sectional view schematically showing another example of a magnetic head used in the embodiment is shown.

As shown in FIG. 16, the example 4 has a configuration identical to FIG. 4 except that the spin torque control element 65 includes a first nonmagnetic conducting layer 65a provided on the tip end portion 60a of the main pole 60 and constituted of a material having a short spin diffusion length, and lamination 65-1 as a magnetization control layer constituted of a magnetization control layer 65e, second nonmagnetic conducting layer 65d provided on the magnetization control layer 65e and constituted of a material having a long spin diffusion length, magnetization control layer 65e, and second nonmagnetic conducting layer 65d all of which are alternately provided on the conducting layer 65a. Here, the nonmagnetic conducting layer 65a can be omitted as the need arises. Further, it is also possible to make a bias current flow according to such a polarity that a current is applied from the tip end portion 60a of the main pole 60 to the tip end portion 62a of the return magnetic pole 62 through the second nonmagnetic conducting layer 65d, magnetization control layer 65e, second nonmagnetic conducting layer 65d, and magnetization control layer 65e by reversing the order of forming, on the main pole tip end portion 60a of the main pole 60, the magnetization control layer 65e, second nonmagnetic conducting layer 65d, magnetization control layer 65e, and second nonmagnetic conducting layer 65d.

By stacking the layers respectively having the following materials and thicknesses on top of each other in layers in sequence from a position on a main pole 60 between the main pole 60 and return magnetic pole 62 both of which are constituted of FeCo, whereby film formation of a spin torque control element 65 was carried out and the samples 14 was manufactured.

Sample 14
first nonmagnetic conducting layer 65a Ta 5 nm
magnetization control layer 65e NiFe 3 nm
nonmagnetic conducting layer 65d Cu 2 nm
magnetization control layer 65e NiFe 5 nm
nonmagnetic conducting layer 65d Cu 2 nm When a lamination of the nonmagnetic conducting layers 65d and magnetization control layers 65e is provided on the tip end portion 62 as shown in FIG. 16, the second nonmagnetic conducting layer 65b can be omitted.

Figure 17:
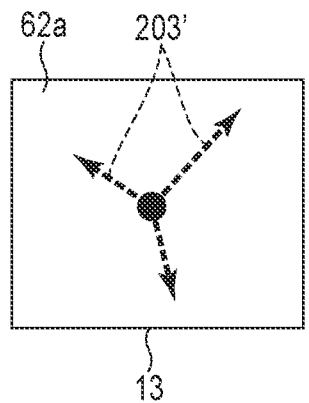
FIG. 17 is a model view showing an example of a direction of magnetization of a return magnetic pole.

FIG. 17 is a model view showing an example of a direction of magnetization of the return magnetic pole viewed from the direction of an arrow 201 of FIG. 16.

Figure 18:
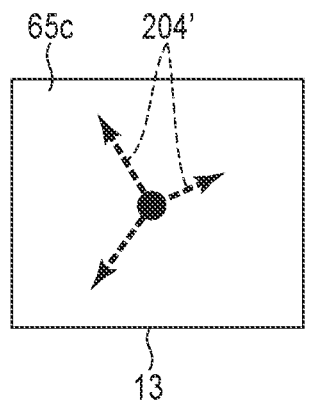
FIG. 18 is a model view showing an example of a direction of magnetization of a magnetization control layer.

FIG. 18 is a model view showing an example of a direction of magnetization of the magnetization control layer viewed from the direction of the arrow 201 of FIG. 16.

Figure 19:
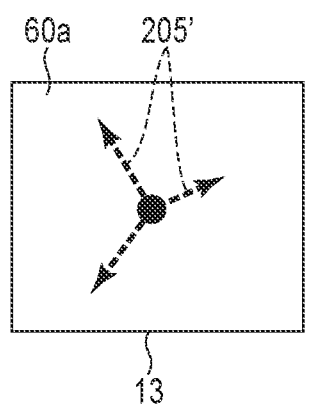
FIG. 19 is a view showing an example of a direction of magnetization of a main pole tip end portion.

FIG. 19 is a view showing an example of a direction of magnetization of the main pole tip end portion viewed from the direction of the arrow 201 of FIG. 16.

In the above figures, numerals 203', 204', and 205' are each arrows indicating directions of magnetization. A numeral 13 indicates the ABS side.

In the other examples of the magnetic head used in the embodiment too, regarding the magnetization state after write, as shown in FIGS. 17 to 19, magnetization of each of the tip end portion 62a of the return magnetic pole 62, magnetization control layer 65-1, and tip end portion 60a of the main pole 60 remains in a state where the magnetization is in disorderly directions in the plane of the formed film even when a magnetic erasing operation based on a degaussing operation is carried out, and hence a magnetoresistance effect occurs according to the relative angle between the longitudinal magnetization of the magnetization control layer 65-1 and longitudinal magnetization of the tip end portion 62a of the return magnetic pole 62, and the resistance value is changed by the magnetization state after write.

In order to suppress the variations in the resistance value, as in the case of, for example, the magnetization control layer 65c of the sample 12, it is also possible to use, as a material for the magnetization control layer 65e, a material having an absolute value of the spin polarizability β of 0 to 0.2 such as FeCr or the like in place of NiFe.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
a main pole;
an auxiliary magnetic pole, with a write gap provided between the auxiliary magnetic pole and the main pole;
a recording coil wound around a magnetic circuit including the main pole and the auxiliary magnetic pole;
a recording current control portion which supplies a recording current to the recording coil;
a spin torque control element provided in the write gap;
a bias current control portion which supplies a bias current to the spin torque control element; and
a resistance measuring portion which measures a resistance value of the spin torque control element, wherein
the spin torque control element comprises a magnetization control layer and nonmagnetic conducting layers,
a condition $tF \leq \lambda F$ is established, where $tF$ represents a film thickness of the magnetization control layer and $\lambda F$ represents a spin diffusion length thereof,
a condition $ts \geq \lambda s$ is established, where is represents a film thickness of the nonmagnetic conducting layers and $\lambda s$ represents a spin diffusion length thereof, and
a variability rate of the resistance value of the spin torque control element that is measured a plurality of times after a write operation with respect to a minimum of the measured resistance value is less than or equal to 4%.

2. The magnetic head of claim 1, wherein the magnetization control layer comprises an alloy material comprising at least one first element of iron or nickel and at least one second element of chromium, vanadium, manganese, titanium, scandium, molybdenum, palladium, or iridium.

3. The magnetic head of claim 2, wherein the alloy material does not contain cobalt.

4. The magnetic head of claim 1, wherein the magnetization control layer comprises a multilayers of a first layer containing at least one first element of iron or nickel and a second layer containing at least one second element of chromium, vanadium, manganese, titanium, scandium, molybdenum, palladium, or iridium.

5. The magnetic head of claim 4, wherein the first layer of the multilayers does not contain cobalt.

6. A magnetic recording/reproducing device comprising:
a magnetic head including
a main pole,
an auxiliary magnetic pole., provided with a write gap provided between the auxiliary magnetic pole and the main pole,
a recording coil provided to be wound around a magnetic circuit including the main pole and the auxiliary magnetic pole;
a recording current control portion supply a recording current to the recording coil;
a spin torque control element provided in the write gap,
a bias current control portion which supplies a bias current to the spin torque control element, and
a resistance measuring portion which measures a resistance value of the spin torque control element, wherein
the spin torque control element comprises a magnetization control layer and nonmagnetic conducting layers,
a condition $tF \leq \lambda F$ is established, where $tF$ represents a film thickness of the magnetization control layer and $\lambda F$ represents a spin diffusion length thereof,
a condition $ts \geq \lambda s$ is established, where is represents a film thickness of the nonmagnetic conducting layers and $\lambda s$ represents a spin diffusion length thereof, and
a variability rate of the resistance value of the spin torque control element that is measured a plurality of times after a write operation with respect to a minimum of the measured resistance value is less than or equal to 4%.

7. The magnetic recording/reproducing device of claim 6, wherein
the magnetization control layer comprises at least one first element of iron or nickel and at least one second element of chromium, vanadium, manganese, titanium, scandium, molybdenum, palladium, or iridium.

8. The magnetic recording/reproducing device of claim 7, wherein the magnetization control layer does not contain cobalt.

9. The magnetic recording/reproducing device of claim 6, wherein
the magnetization control layer comprises a multilayers of a first layer containing at least one first element of iron or nickel and a second layer containing at least one second element of chromium, vanadium, manganese, titanium, scandium, molybdenum, palladium, or iridium.

10. The magnetic recording/reproducing device of claim 9, wherein the first layer of the multilayers does not contain cobalt.

* * * * *

UNITED STATES PATENT AND TRADEMARK OFFICE
CERTIFICATE OF CORRECTION

PATENT NO. : 11,817,135 B2  
APPLICATION NO. : 17/860430  
DATED : November 14, 2023  
INVENTOR(S) : Gaku Koizumi Page 1 of 1

It is certified that error appears in the above-identified patent and that said Letters Patent is hereby corrected as shown below:

In the Claims

Column 16, Line 20, Claim 1, replace "is" with "ts".

Column 16, Line 63, Claim 6, replace "is" with "ts".

Signed and Sealed this  
Sixth Day of January, 2026

John A. Squires  
*Director of the United States Patent and Trademark Office*